United States Patent [19]

Salensky

[11] 4,292,268

[45] Sep. 29, 1981

[54] LIQUID EPOXY MOLDING SYSTEM

[75] Inventor: George A. Salensky, Whitehouse Station, N.J.

[73] Assignee: Union Carbide Corporation, New York, N.Y.

[21] Appl. No.: 122,496

[22] Filed: Feb. 19, 1980

[51] Int. Cl.³ .............................................. B29C 25/00
[52] U.S. Cl. ............................. 264/236; 260/37 EP; 264/328.2; 264/328.6
[58] Field of Search ............ 264/236, 328, 329, 328.6, 264/328.2; 260/37 EP

[56] References Cited

U.S. PATENT DOCUMENTS

| | | | |
|---|---|---|---|
| 2,548,447 | 4/1951 | Shokal et al. | 260/32.4 |
| 3,052,650 | 9/1962 | Wear et al. | 528/93 |
| 3,073,786 | 1/1963 | Kraft et al. | 525/529 |
| 3,117,099 | 1/1964 | Proops et al. | 260/18 EP |
| 3,929,716 | 12/1975 | Komoto et al. | 260/37 EP |
| 3,963,796 | 6/1976 | Yokono et al. | 260/37 EP |
| 4,009,141 | 2/1977 | Nichols et al. | 260/37 EP |
| 4,142,416 | 3/1979 | Smith et al. | 260/37 EP |

Primary Examiner—Donald E. Czaja
Assistant Examiner—W. Thompson
Attorney, Agent, or Firm—Bernard Francis Crowe

[57] ABSTRACT

Injection molding of liquid epoxy resins is facilitated by adding an organic acid plus a siliceous filler to the curable epoxy resin system which thickens and thereby precludes leaking of resin from the mold.

15 Claims, No Drawings

LIQUID EPOXY MOLDING SYSTEM

BACKGROUND OF THE INVENTION

This invention pertains to liquid epoxy molding systems and particularly to the addition of a mixture of organic carboxylic acid and silica to the system to thicken it prior to cure.

The use of liquid epoxy molding compounds for transfer and injection molding applications are relatively new. In comparison with solid epoxy molding materials, which are extensively used for the encapsulation of electronic components and the manufacture of electrical insulators, the liquid epoxy resins offer the ability to be molded under low pressures, that is, about 5 psi to about 1000 psi, with the result that large moldings can be processed in presses with relatively low tonnage clamping capacities. This also makes possible the use of such liquid epoxy resins as liquid cycloaliphatic epoxy resins for normal transfer molding operations.

The use of liquid epoxy molding compounds for transfer and injection molding applications, however, is hampered by two serious problems. Firstly, the low viscosity of the liquid epoxy resin contributes to poor rheological properties during the injection into the mold with the result that voids or air inclusions become a problem. Secondly the low viscosity of the system also contributes to resin seepage through the land area of the mold as well as to excessive wetting of the mold cavity. The latter effect interferes with the release of the molded article from the mold cavity. The former effect makes it difficult to remove resin flashing which creates a problem serious enough to render the process of molding liquid epoxy resins impractical.

Attempts to solve the resin seepage problem by incorporating solid cycloaliphatic epoxy resins with liquid epoxy resin in the molding composition lessened void formation but did not provide a satisfactory commercial process.

Another approach to the solution of the problems associated with molding liquid epoxy resins involved modifying the normal operation of a reciprocating screw injection machine. The modification consisted of intentionally advancing the molding system at an elevated temperature and specified dwell time so that the viscosity of the molding composition injected into the mold was many times higher than would be the case if processed according to accepted practice for injection molding. Marginal improvements were effected which did not give completely acceptable results.

SUMMARY OF THE INVENTION

A method of injection molding of liquid epoxy resin compositions has been devised which comprises:
(A) Blending a mixture of:
 (1) about 65 to about 100 parts by weight of a normally liquid epoxy resin having an epoxy equivalent of about 140 to about 225 grams/gram mole of oxirane oxygen;
 (2) about 3 to about 15 parts by weight of an organic carboxylic acid containing at least about 6 carbon atoms and at least one free carboxyl group;
 (3) about 2 to about 250 parts by weight of a siliceous filler having a minimum surface area of 0.5 m²/g; and
 (4) about 0 to about 30 parts by weight of a reactive diluent containing at least one 1,2-epoxy group;
with an approximately stoichiometric amount of a polyfunctional, primary or secondary amine used as a curing agent for liquid epoxy resins;
(B) injecting the resultant mixture at a temperature of about 25° C. to about 150° C. and a pressure of up to about 500 psig into a pressure mold; and
(C) retaining the mixture in said mold until hardened sufficiently so that the molded mixture can be ejected from the mold without distortion.

Previous attempts to utilize the liquid injection molding systems have included rapid curing systems which harden before leakage occurs at the mold level. This, however, causes an insufficient mold fill if a different mold is used requiring longer flow. The instant method is unique in that it produces a thickened grease-like composition which will travel to all parts of the mold under pressure without leaking at the lands. After this is accomplished the slower primary curing mechanism of the epoxy system takes control and produces a hardened molded product. This primary curing mechanism is the known reaction of epoxy groups and/or hydroxy groups with crosslinking agents.

A preferred method of injection molding these compositions is by means of two feed pumps which inject streams into the mold in the desired proportions through a mixing head which may be mechanical or of the static mixing type. A commercial model of the latter type of mixer is available commercially from the Kenics Corporation of Danvers, Massachusetts. Other mixers which may be used include those sold by Koch Engineering of New York, New York, Komax of Carson, Calif. or Charles Ross & Sons, Inc. of Hauppauge, New York. Dual Component injection equipment also called Reaction Injection Molding equipment abbreviated as RIM are of the type manufactured by Kraus Maffei of West Germany; Martin Sweets Co. of Louisville, Ky. and Milacron of Cincinnati, Ohio. It is desirable to keep the resin and hardener streams separate until just before their introduction into the mold. In doing this one maintains the advantage of low viscosity for premixing and metering ease while after mixing the grease-like composition which develops is well contained in the mold prior to curing.

It is preferred that the viscosity of the liquid epoxy resin, when measured before addition of filler or other components of the mixture, be less than about 1000 cps. However higher viscosity liquid epoxy resins can also be used by merely adding an appropriate amount of reactive diluent having at least one 1,2-epoxy group. This is usually no more than 30 parts by weight per 100 parts of liquid epoxy resin.

The liquid epoxy resins of this invention contain the epoxy

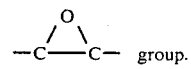

group.

They are thermosetting resins but are not self-curing or self-hardening and must be mixed with amine curing agents to effect molding to a hardened state.

These liquid epoxy resins, all of which are known in the art and are commercially available, contain aromatic, aliphatic, or cycloaliphatic backbones. The aromatic liquid epoxy resins are produced by the interaction of epihalohydrins, such as, epichlorohydrin and polyhydroxy phenols giving rise to the appellation, polyglycidyl ethers of polyhydric alcohols. The preferred aromatic aromatic liquid epoxy resin used in the practice of this invention is that derived from the interaction of epichlorohydrin and bisphenol A, i.e., 2,2-(p-hydroxyphenyl) propane.

The aliphatic and cycloaliphatic liquid epoxy resins are formed by reacting peracetic acid with olefinic esters of cycloaliphatic compounds. Some preferred cycloaliphatic epoxy resins include the following:

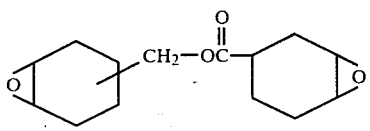

3,4-epoxycyclohexylmethyl 3,4-epoxycyclohexane

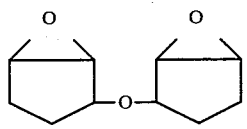

bis(2,3-epoxycyclopentyl) ether

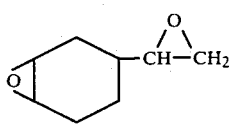

vinyl cyclohexene dioxide, and

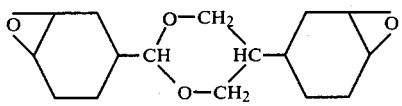

2-(3,4-epoxycyclohexyl-5,5-spiro)-(3,4-epoxy) cyclohexane-m-dioxane.

A preferred example of a liquid aliphatic epoxy resin is hexahydrophthalic diglycidyl ester. Others include hydrogenated bisphenol A diglycidyl ether, dimethyl hydantoin diglycidyl amine and epoxidized butadiene.

A general description of the preparation of thermosetting epoxy resins is presented in the Encyclopedia of Polymer Science and Technology, pp. 209–216, Vol. 6, Interscience Publishers, New York City, 1967, which is incorporated herein by reference.

The term "epoxide equivalent" is defined herein as in Epoxy Resins by H. Lee and K. Neville, page 21, McGraw-Hill Book Co., Inc., NYC (1957), viz., the weight of epoxy resin in grams which contains 1 gram equivalent of epoxy, i.e.,

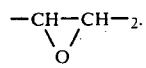

Epoxide equivalents are determined by reacting a known quantity of resin with a known quantity of hydrochloric acid and back-titrating the remaining acid to determine its consumption.

The organic carboxylic acids used in this invention can be monocarboxylic or polycarboxylic. Thus for example one can use saturated aliphatic monocarboxylic acids, such as, pelargonic, capric, undecanoic, and lauric acids; unsaturated aliphatic monocarboxylic acids, such as, oleic, linoleic, linolenic, arachidonic, $\Delta^9$-decylenic, stillingic, palmitoleic, petroselenic, vaccenic, punicic, liconic, parinaric, cetoleic, or erucic acids and the like; dicarboxylic acids, such as, dodecenyl succinic acid, octadecyl succinic acid, azelaic acid, and the like; polymerized unsaturated fatty acids, such as, dimers and trimers of linoleic acids made by a Diels-Alder reaction between 9,12-linoleic acid and 9-11-linoleic acid, and the like; and polymerized ethylenically unsaturated carboxyl-containing olefins, such as, polyacrylic acid, polymethacrylic acid, styrene/maleic acid copolymers, and the like.

One can also use aromatic carboxylic acids, such as, pamoic acid or 4,4-methylenebis(3-hydroxy-2-naphthoic acid) having the formula

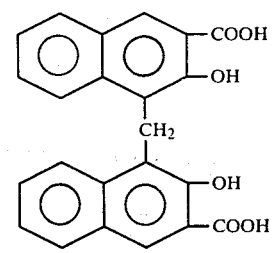

as well as naphthoic acid, naphthalic acid, and salicylic acid and the like.

Suitable siliceous fillers which can be used include amorphous silica, pyrogenic silica, microcrystalline silica, macrocrystalline silica, ground quartz, calcium metasilicate, hydrous aluminum silicate passivated with a silane having the formula $Si_nH_{2n}=2$ where n is an integer having values of 1 to 4, and the like. The amount of siliceous filler required in the compositions of this invention is inversely proportional to its surface area.

Thus, for example, 3 to 5 parts by weight of pyrogenic silica having a surface area of 200 meters$^2$/gram is effective whereas silica having a surface area of 2 meters$^2$/gram requires 100 parts to provide an equivalent effect.

Any of the reactive diluents known in the epoxy resin field can be used in the practice of this invention. Illustrative diluents include glycerol-based epoxy resins, phenyl glycidyl ether, butyl glycidyl ether, octylene oxide, styrene oxide, allyl glycidyl ether, propylene oxide, and the like.

No special equipment is needed for mixing the components used herein.

The injection molding equipment in which this inventive procedure is used is conventional and well known to those skilled in the art.

Mesh sizes for silicas used refer to standard U.S. sieve screens used for measuring particle size.

The polyfunctional amine curing agents used in this invention include primary aliphatic amines, such as, ethylene diamine, propylene amine and the like, as well as mixed primary-secondary or tertiary amines, such as, diethylene triamine, triethylene tetramine, dimethylamino propylamine, diethylamino propylamine, and the like; as well as amine adducts of epoxides.

As with other epoxy resin molding systems, the molded mixtures obtained by this invention can be post-cured for specific properties.

Although temperatures of about 25° C. to about 150° C. can be used, it is preferred to use temperatures about 80° C. to about 110° C.

Although pressures of up to about 500 psig can be used, it is preferred to pressures in the range of about 15 to about 50 psig.

The term "amine value" as used herein is defined as the number of milligrams of KOH which are equivalent to a 1 gram sample of the amine curing agent used or the number of milligrams of KOH which is equivalent to 1 gram of amine curing agent as determined by titration with standard hydrochloric acid. While the amine value of the amine curing agents used is not narrowly critical, it is preferred to use amines having an amine value of about 300 to about 3000.

The invention is further described in the Examples which follow. All parts and percentages are by weight unless otherwise specified.

EXAMPLE 1

A mixture of 88 parts of a diglycidyl ether of Bisphenol A having an epoxy equivalent of 185–200 and an average molecular weight of 350–400, 5 parts of polymerized fatty acids (sold by Emery Industries Inc. as Emery 1041), 12 parts of butyl glycidyl ether and 100 parts of micro crystalline silica (325 mesh; surface area 2 $m^2/g$ Novocite-Malvern Minerals Co.) was first prepared in suitable blending apparatus. (The polymerized fatty acid is generally dissolved in the butyl glycidyl ether and the mixture is then added to the epoxy resin.) To this mixture was added 12 parts by weight of triethylene tetramine with stirring at about 25° C. The RVF Brookfield Viscosity of the resultant mixture was measured as 24,000 centipoise at a spindle speed of 20 rpm using Spindle #7. This viscosity is adequate for use in commercial injection molding systems.

Control A

Example 1 was repeated with the exception that no polymerized fatty acid was added. The Brookfield Viscosity was only 1600 centipoise. This viscosity is low for an epoxy resin injection molding composition.

EXAMPLE 2 AND CONTROL B

Example 1 and Control A were repeated with the exception that the components were mixed at 60° C. to more closely approximate actual molding conditions. The composition of Example 2 rapidly thickened in less than 30 seconds and had a Brookfield viscosity after 3 minutes of 14,200 centipoise using Spindle #4 with a spindle speed of 20 rpm at 60° C.

The Control B had a Brookfield viscosity initially of 300 centipoise and 820 centipoise after 3 minutes which is low for an epoxy resin injection molding composition.

EXAMPLE 3

Example 1 was repeated with the exception that 5 parts of pamoic acid was substituted for the polymerized fatty acid. After mixing the components at 25° C., the Brookfield viscosity was 24,600 centipoise at 20 rpm using Spindle #6.

EXAMPLE 4

Example 3 was repeated with the exception that 5 parts of styrene-maleic acid copolymer (a partial ester form with a number average molecular weight of 2500 similar to Arco Chemical Company SMA 1440) was substituted for the pamoic acid. The mixture had a Brookfield viscosity at 25° C. of 13,000 centipoise using Spindle #6.

EXAMPLE 5

The procedure described in EXAMPLE 1 was repeated using 88 parts of diglycidyl ether, 12 parts of butyl glycidyl ether, 1 part of Carbopol 910 (a polyacrylic acid sold by Goodrich having a molecular weight of about 1 million), 1 part of Cab-O-Sil (a pyrogenic silica sold by the Cabot Corp.) and 12 parts of triethylene tetramine. The mixture thickened immediately after mixing and was suitable for use in conventional injection molding equipment.

EXAMPLE 6

The procedure described in Example 1 was repeated using 88 parts of diglycidyl ether, 12 parts of butyl glycidyl ether, 6 parts of azelaic acid, 100 parts of 325 mesh micro crystalline silica mixed with 12 parts of triethylene tetramine.

The mixture thickened immediately after mixing and had a Brookfield viscosity at 25° C. of 36,000 centipoise at 20 rpm using Spindle #6.

Control C

When Example 1 was repeated without the micro crystalline silica, no thickening resulted.

Although the invention has been described in its preferred forms with a certain degree of particularity, it is understood that the present disclosure has been made only by way of example and that numerous changes can be made without departing from the spirit of the scope of the invention.

What is claimed is:

1. Method of injection molding of liquid epoxy resin compositions which comprises:
    (A) Blending a mixture of:
        (1) normally liquid epoxy resin having an epoxy equivalent of about 140 to about 225 grams per gram mole of oxirane oxygen;
        (2) about 3 to about 15 parts by weight of an organic carboxylic acid containing at least 6 carbon atoms and at least one free carboxyl group;
        (3) about 2 to about 250 parts by weight of a siliceous filler having a minimum surface area of 0.5 $m^2/g$.; and
        (4) about 0 to about 30 parts by weight of a reactive diluent containing at least one 1,2-epoxy group; with an approximately stoichiometric amount of a polyfunctional, primary or secondary amine used as a curing agent for liquid epoxy resins;
    (B) injecting the resultant mixture at a temperature of about 25° C. to about 150° C. and a pressure of up to about 500 psig into a pressure mold; and
    (C) retaining the mixture in said mold until hardened sufficiently so that the molded mixture can be ejected from the mold without distortion.

2. Method claimed in claim 1 wherein the hardened mixture ejected from the mold is post-cured.

3. Method claimed in claim 1 wherein the temperature in the mold is about 80° C. to about 110° C.

4. Method claimed in claim 1 wherein the pressure is about 15 to about 50 psig.

5. Method claimed in claim 1 wherein the curing agent has an amine value of about 300 to about 3000.

6. Method claimed in claim 1 wherein the siliceous filler is amorphous silica.

7. Method claimed in claim 1 wherein the siliceous filler is ground quartz.

8. Method claimed in claim 1 wherein the siliceous filler is microcrystalline silica.

9. Method claimed in claim 1 wherein the siliceous filler is macrocrystalline silica.

10. Method claimed in claim 1 wherein the siliceous filler is calcium metasilicate.

11. Method claimed in claim 1 wherein the siliceous filler is hydrous aluminum silicate passivated with a silane.

12. Method claimed in claim 1 wherein the organic carboxylic acid is pamoic acid.

13. Method claimed in claim 1 wherein the organic carboxylic acid is a dimer acid derived from 9,12-linoleic acid and 9,11-linoleic acid by a Diels-Adler reaction.

14. Method claimed in claim 1 wherein the organic carboxylic acid is polyacrylic acid.

15. Method claimed in claim 1 wherein the organic carboxylic acid is a styrene-maleic acid copolymer.

* * * * *